INVENTOR
GEORGE LIPPERT

United States Patent Office 3,484,955
Patented Dec. 23, 1969

3,484,955
TEACHING MACHINE
George Lippert, Northport, N.Y., assignor to Sayre Ross and Herman Zuckerman, New York, N.Y.
Filed Oct. 24, 1967, Ser. No. 678,776
Int. Cl. G09b *19/06;* G11b *5/00*
U.S. Cl. 35—35
10 Claims

ABSTRACT OF THE DISCLOSURE

A teaching machine for use with a master lesson tape and a student tape for selectively recording on the student tape portions of the lesson and student responses thereto. The lesson tape is stopped after each instructional sequence, with the instructional sequence and the subsequent student response thereto both being recorded on the student tape. Thus, at the end of the lesson the student tape contains a recording of the complete lesson interspersed with student responses. By operating a sound-on-sound switch the student can control simultaneous recording of instructional material and his own accompaniment on the student tape. An end-of-question detector automatically stops the running of the lesson tape each time a student response is required. An end-of-lesson detector completely disables the lesson tape drive at the end of the lesson such that subsequent operation of the system can be reinitiated only after the endless loop lesson tape cartridge is first removed from the machine.

---

Figure 1:
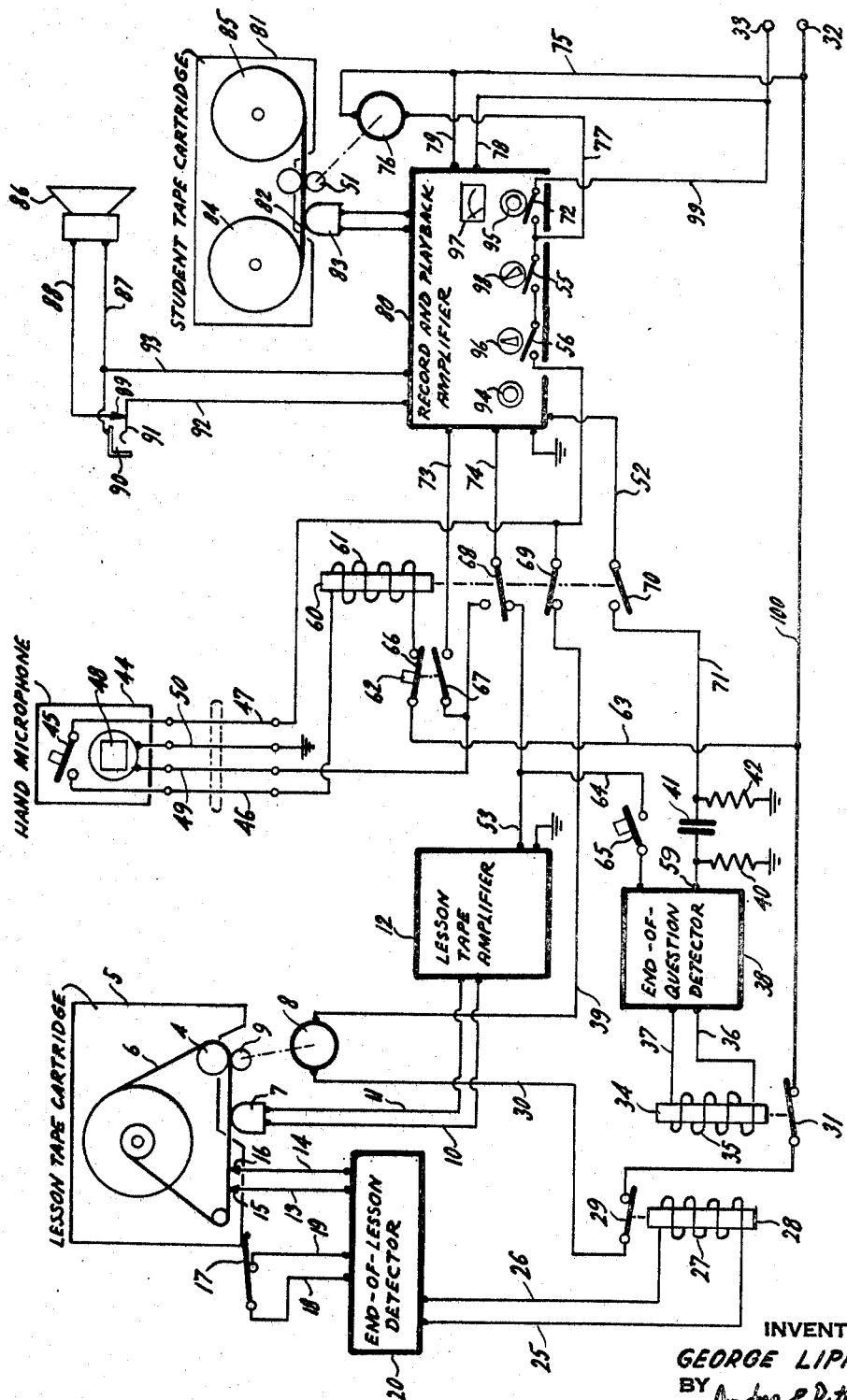

This invention relates to teaching machines, and more particularly to teaching machines for use with master lesson tapes containing thereon programmed lessons, and student tapes for selectively recording thereon portions of the lessons and student responses thereto.

Numerous machines have been proposed for aiding a student to master various types of instructional material. Typical of the uses of such a machine is facilitating the learning of a foreign language. A master lesson tape is provided on which are recorded foreign language words and instructions for the student. The student can control the playback of the lesson tape but cannot erase or record over it. A second tape is provided for student recording purposes. The student can control the recording of portions of the lesson on his student tape, following each portion of the lesson with his response which is also recorded on his tape. Thus, during the lesson the student tape contains on it instructional material interspersed with student responses. By playing back the student tape, portions of the lesson and responses thereto can be reviewed.

Of course, teaching machines of the type described generally include various control mechanisms to enable the student to control the progress of the lesson as he sees fit. For example, on many machines the student is able to edit his tape during the course of the lesson by playing it back and changing his responses.

Prior art teaching machines of the type described generally exhibit one or both of two serious shortcomings. The first relates to gaps or blanks which are often provided on the lesson tape. In many machines the lesson and student tapes run continuously. The instructional material is transferred from the lesson tape to the student tape. Since the student must respond to the different instructional sequences, gaps are provided between them on the lesson tape in order that the student have time to record his responses on the student tape. There are two obvious disadvantages with such an approach. First, the lesson tape is unnecessarily long because the lesson sequences are separated by blank tape sections. Second, the student must complete his response in the given time before the next lesson sequence is transferred to the student tape.

In other machines the student can stop the lesson tape after each lesson sequence while he records his response on the student tape. However, this second type of teaching machine generally exhibits another serious shortcoming. Typically, a lesson sequence is transferred from the lesson tape to the student tape following which the student records his response while the lesson tape drive remains off. But following each question-answer sequence recorded on the student tape, or a short series of such questions and answers recorded on the student tape, the student tape (usually of the endless loop type) is returned to the initial position for a new cycle and the previously recorded information is erased. Although during the lesson itself the student can review the recording on the student tape, when the next series of questions and answers is recorded on the tape the previously recorded series is erased. Consequently, at the end of the entire lesson there is no permanent record of the entire lesson for the student to review. At most, the only permanent record is the last series of questions and answers recorded on the student tape.

It is a general object of this invention to provide a teaching machine of the type described which does not require blank portions on the lesson tape between successive instructional sequences for the purpose of allowing the recording of student responses, and which also provides the student with a recording of the entire lesson (questions and answers) at the end of the session.

It has been found that in many situations it is desirable to allow the student to record on the student tape at the same time that the lesson tape material is heard and recorded on the student tape. For example, if the lesson tape relates to piano instruction it has been found advantageous to first have the instructor's playing of a piece heard by the student and recorded on the student tape, followed by the student playing the piano along with the instructor. Thus, the lesson tape might be provided with a recording of the instructor's version of the piece, followed by an instruction to the student to play along with the instructor, followed by the instructor repeating his playing of the piece. During the learning session the student hears the three successive sound sequences on the lesson tape at the same time that these three sequences are recorded on the student tape. During the second sequence, which prepares the student to play along with the instructor, the student may operate a control switch which allows his playing of the piece to be recorded on the student tape along with the second play of the piece by the instructor. This "sound-on-sound" control should be simple to operate and selective in that the student should have the option of either recording his response alone, or recording it together with the instructor's version of what the response should be.

It is another object of this invention to provide a "sound-on-sound" control of the type described.

Recently, more and more tape recorders are designed for use with tape cartridges rather than the conventional separately mounted feed and take-up reels. The endless loop type cartridge is particularly advantageous because of the simple operation it affords. However, this type of cartridge is disadvantageous in that rewind is not possible with it. Only forward movement of the tape is possible. Because the tape is endless the beginning of the recording follows the end of the recording. If the lesson is recorded on an endless tape of this type and the student allows the tape to run past the end of the lesson, the lesson will be repeated. Although the student can remove the tape cartridge after the lesson, if he allows the tape to run slightly into the beginning of the lesson the next student who uses the cartridge will not hear the lesson from its start unless he first plays the tape through the remainder of the lesson.

It is another object of this invention to provide an end-of-lesson detector for preventing further play of the lesson tape after the end of the lesson is reached unless the student first removes the lesson tape cartridge from the machine.

In the ordinary use of a teaching machine of the type described the lesson tape is stopped prior to each student recording. When the lesson tape is being played, the student tape runs in the forward direction and the instruction and the instructional material is recorded on it. For the student to record his response and to stop the lesson tape during this interval, a control button is provided for the student to operate. However, many students, especially children, are prone to forget to operate the button before they start responding. In such a case, the lesson tape may continue to run and the entire lesson may be disrupted.

It is another object of this invention to provide an end-of-question detector for automatically stopping the lesson tape at the end of each sequence of instructional material.

The teaching machine of my invention is provided with two tape transport mechanisms, one for a lesson tape cartridge and the other for a student tape cartridge. A record and playback amplifier is associated with the student tape cartridge for controlling the recording of instructional sequences and student responses. This amplifier also allows the student to rewind his tape and to review selected portions of it. The amplifier is coupled to a speaker to allow the student to hear either lesson material fed into the amplifier for recording purposes, or material on the student tape played back for review purposes.

The record and playback amplifier is provided with two inputs. There are also two input sources—the lesson tape and the output of a microphone into which the student speaks. The lesson tape and microphone outputs are both selectively coupled to one of the two amplifier inputs. A finger-operated button on the microphone controls the connection of either source to this first amplifier input. In the normal position of the button the microphone is disabled and the lesson tape is played. The lesson tape output is coupled to the first of the amplifier inputs and is both heard from the speaker and recorded on the student tape. When the finger-operated button is pressed by the student, the lesson tape stops moving and the microphone output is coupled to the first of the amplifier inputs. The student response is at this time recorded on the student tape.

The teaching machine includes a sound-on-sound manually operated switch which overrides the finger-operated button on the microphone. When the sound-on-sound switch is operated the finger-operated button on the microphone has no effect on the system. Instead, the lesson tape output is coupled to the first of the amplifier inputs and the microphone output is coupled to the second. Thus, only when the sound-on-sound switch is operated is simultaneous recording of instructional material and student response effected.

In series with the drive motor for the lesson tape cartridge are two contacts. Both are normally closed and permit the lesson tape to be driven. One of these contacts is opened under control of an end-of-lesson detector and the other is opened under control of an end-of-question detector. On the lesson tape itself between the beginning and end of the lesson is a conductive strip of material. This strip of material is sensed by a pair of contacts connected to the end-of-lesson detector. When the strip passes by the contacts, the detector controls the opening of the respective contact in series with the lesson tape drive motor. At this time the motor shuts off. It can only be enabled once again after the lesson tape cartridge is removed from the machine and reinserted. Consequently, it is always necessary for the student to remove the lesson tape cartridge at the end of each lesson, and it is thus impossible for the student to inadvertently allow the lesson tape to run past the end of the lesson into the beginning of the lesson.

If the student wishes to insure that the lesson tape will always stop at the end of each question or other sequence of instructional material, he may operate a manually operated switch for turning on an end-of-question detector. Following each question on the lesson tape there is recorded a high frequency inaudible tone. The end-of-question detector senses this tone and opens the second contact in series with the lesson tape drive motor. This second swicth closes again only after the student has closed the finger-operated button on the microphone for controlling the recording of his response and then released it. With the release of the button the second contact in series with the lesson tape drive motor is closed, and the lesson tape resumes running.

It is a feature of this invention to provide a teaching machine for operating in conjunction with lesson tape and student tape cartridges, the machine including controls for selectively stopping the lesson tape and recording the entire lesson interspersed with student responses on the student tape.

It is a further feature of this invention to provide a sound-on-sound control for allowing simultaneous recording of lesson tape sequences and student responses on the student tape.

It is a further feature of this invention to provide an end-of-lesson detector for disabling the lesson tape drive motor at the end of each lesson and for preventing further energization of the drive motor until the lesson tape cartridge has been removed from the machine and another or the same one has been reinserted into the machine.

It is a still further feature of this invention to provide a selectively operated end-of-question detector for automatically controlling the stopping of the lesson tape in accordance with programmed stop signals recorded on the lesson tape.

Figure 2:
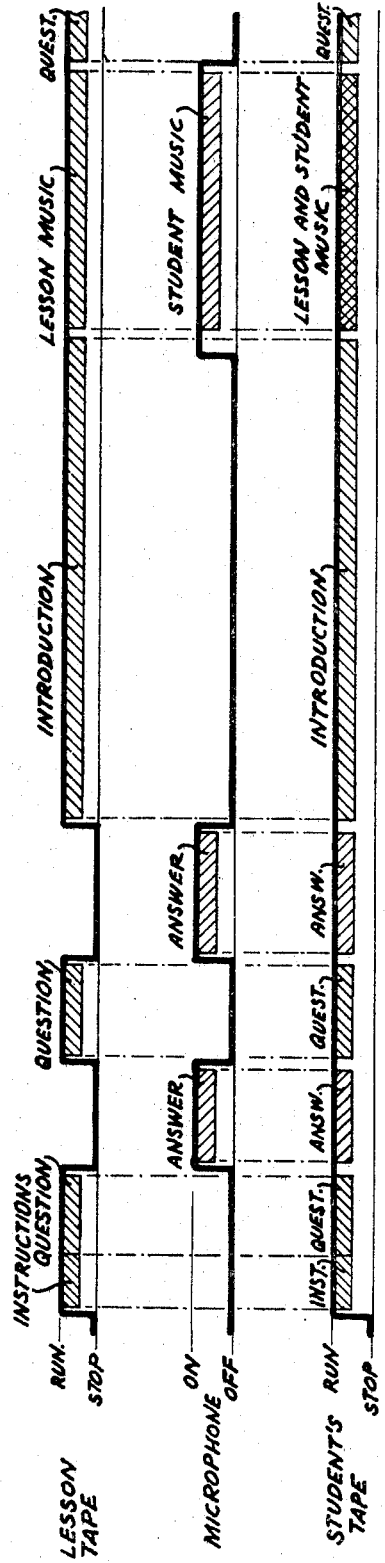

Further objects, features and advantages of my invention will become apparent upon consideration of the following detailed description in conjunction with the drawing, in which:

FIG. 1 is a schematic illustration of a preferred embodiment of my invention, and FIG. 2 is a timing diagram illustrating typical record and playback sequences.

The teaching machine of FIG. 1 is provided with two tape transport mechanisms. A lesson tape cartridge 5, having a lesson recorded on tape 6 within it, is insertable into the machine. Tape 6 passes over drive idler 4, and when the cartridge is inserted in the machine drive capstan 9 bears against tape 6 and idler 4. When motor 8 is operated drive capstan 9 turns and causes tape 6 to rotate in the counter-clockwise direction. As the tape moves past tape head 7 the signals recorded on it are transmitted via conductors 10 and 11 to lesson tape amplifier 12.

Contacts 15 and 16 are connected via conductors 13 and 14 to end-of-lesson detector 20. The contacts serve to sense a short section of conducting material on tape 6 for indicating the end of a lesson. Also, when cartridge 5 is first inserted in the machine contact 17 closes and conductors 18 and 19 are shorted together. When the cartridge is removed, contact 17 opens. The functions of contacts 15, 16 and 17 will be described below.

Student tape cartridge 81 contains two reels 84 and 85 around which is wound student tape 82. Tape 82 is driven counter clockwise by capstan 51 for recording or playback and is driven clockwise during rewinding by reel 84. The capstan is controlled by motor 76. Although tape head 7 is for playback purposes only, tape head 83 controls both recording on the student tape and playback of it.

Hand microphone 44 is designed to be held by the student. Transducer 48 is connected to conductors 49 and 50. Conductor 50 is grounded as shown. As the student speaks into the microphone electrical signals are transmitted along conductor 49 to the record and playback amplifier 80, as will be described below. On microphone 44 is a finger-operated button switch 45 for connecting conductors 46 and 47. The switch is normally open, and in this position motor 8 drives lesson tape 6 and motor 76 drives student tape 82, with the lesson being recorded on tape 82 and heard by the student via speaker 86. As will be described below, when the student operates switch 45 to connect conductors 46 and 47, the lesson tape stops running. The student tape continues to be driven and the student can record on it. The four conductors 46, 47, 49 and 50 are the only ones extended from the machine itself to the hand microphone.

Record and playback amplifier 80 is of a conventional type and is shown only symbolically in the drawing. An AC input voltage is applied across terminals 32 and 33 and is coupled to the amplifier by conductors 78 and 79. The machine is turned on, however, only when on-off control knob 95 is operated. Also, when the machine is turned on contact 72 closes and current flows from terminal 32 through conductor 75, motor 76, conductor 77, contact 72 and conductor 99 to terminal 33. Motor 76 thus operates. If contacts 55 and 56 are also closed, as will be described below, current also flows from terminal 32 through conductor 100, contact 31, contact 29, conductor 30, motor 8, conductor 39, contact 69, contacts 56, 55 and 72, and conductor 99 to terminal 33. Thus, when the unit is switched on, if contacts 55 and 56 are closed motor 8 also operates to drive lesson tape 6. Although not shown in the drawing, the turning on of the unit and the closing of contact 72 also energizes detectors 20 and 38, and amplifier 12, as is known in the art.

Two-position control knob 96 controls the record and playback functions. In one position, the control causes input signals on conductors 73 and 74, or a signal on only one of them, to be amplified and applied to tape head 83 for recording on tape 82. In the second position, knob 96 causes tape head 83 to sense signals on tape 82. In both positions of the knob the record or playback signals are transmitted va conductors 92 and 93 to speaker 86. The student can thus hear a portion of the lesson tape as it is being recorded on the student tape, and can also listen to a portion of the student tape as it is played back. Contact 56, controlled by knob 96, is closed only when the knob is in the record position. During this time the lesson tape runs and the lesson is recorded on the student tape. During rewinding or playback of the student tape, knob 96 is in the playback position, contact 56 is open, and the lesson tape stands idle.

Three-position control knob 98 controls both the rewind and forward motions of tape 82. Although the motor runs continuously while the machine is on, drive capstan 51 is not driven while knob 98 is in the neutral position. When knob 98 is placed in the forward position, motor 76 drives capstan 51 in a direction to advance the student tape 82 for recording or playback. In the reverse position of knob 98, motor 76 drives tape reel 84 in a direction to rewind the student tape. Contact 55 is open when knob 98 is in the neutral and rewind positions. It is closed only when knob 98 is in the forward position. Consequently, even with power turned on by knob 95, neither tape drive operates if knob 98 is in the neutral position—motor 8 remains de-energized because switch 55 is open, and motor 76 remains de-energized because amplifier 80 does not control its operation unless knob 98 is placed in the forward or rewind position. If knob 98 is placed in the rewind positon, student tape 82 rewinds, but lesson tape 6 remains idle because switch 55 is still open. Only when knob 98 is placed in the forward position can both tapes run. And even then, if knob 96 is in the playback position with contact 56 open, or as will be described below, the student operates button 45 on his microphone, the lesson tape does not run.

Control knob 95 also controls the volume of the audible output by varying the amplitude of the signal applied to conductors 92 and 93. Meter 97 indicates the recording level, which may be controlled by recording level control 94. In general, amplifier 80 and the student tape drive system are of a conventional type as is known in the art. There are only three slight modifications required to incorporate a standard tape recorder in the machine. First, connections (not shown) are preferably made to an AC circuit in the tape recorder for extending power to the remaining units in the overall machine through switch 72 only when power is turned on. Second, connections are made through contacts 55 and 56 to enable the energization of motor 8 only when control knob 98 is in the forward position and control knob 96 is in the record position. Third, conductor 52 is connected to a source of DC voltage inside the standard tape recording unit for a purpose to be described below.

At the beginning of any lesson, power is turned on by operating knob 95 and a lesson tape cartridge 5 is inserted in the machine. Knob 96 is then placed in the record position and knob 98 is placed in the forward position to allow play of lesson tape 6 and recording of the lesson on tape 82. The instructional material sensed by tape head 7 is amplified by amplifier 12. One of the output terminals of this amplifier is grounded. The amplified signal is transmitted over the other output conductor 53 and through contact 68 and conductor 74 to amplifier 80. Conductor 74 is connected to one of the two inputs of record and playback amplifier 80 and the lesson is recorded on tape 82 at the same time it is heard from speaker 86.

When the student desires to stop the lesson tape and to record a response on the student tape, he operates button 45 on the hand microphone. At this time relay 60 operates, current flowing from terminal 32 through conductor 100, conductor 63, normally closed contact 66, relay winding 61, conductor 46, button switch 45, conductor 47, contacts 56, 55 and 72 and conductor 99 to terminal 33. Relay 60 thus operates. Contact 70 closes, contact 69 opens and contact 68 connects conductor 74 to conductor 49 rather than to conductor 53. With the opening of contact 69 current through motor 8 ceases and the lesson tape stops. The student tape continues to run, however, because current continues to flow through the winding of motor 76.

With conductor 53 no longer connected via contact 68 to conductor 74, the output of amplifier 12 is no longer connected to input conductor 74 of amplifier 80. Instead, conductor 74 is connected via contact 68 and conductor 49 to transducer 48, the other end of which is grounded. Accordingly, as the student speaks, plays a musical instrument, etc., his response is recorded on tape 82 in the same manner and via the same channel previously used for the lesson material.

When the student has completed his response, switch 45 is released and the connection between conductors 46 and 47 is broken. At this time current through relay winding 61 ceases and the relay de-energizes. With the closing of contact 69, motor 8 resumes operation. With the switching back of contact 68 to conductor 53 the lesson tape signal is extended to conductor 74 to be recorded on the student tape by tape head 82.

If at anytime during the lesson the student desires to play back and review his tape, control knob 96 is switched to the playback position and knob 98 is switched to the rewind position. Since contacts 55 and 56 are open the lesson tape remains idle. When knob 98 is switched to the forward position, playback takes place. During playback, since knob 98 is in the forward position contact 55 is closed, but since contact 56 is still open motor 8 remains off. (Contact 56 is placed in series with contact 55 because even if the student forgets to switch knob 96 to the playback position, motor 8 will remain off during rewinding since contact 55 is open, and following rewinding, when knob 98 is placed in the forward position the normal lesson recording sequence will occur.) After the student tape has been reviewed and the student is ready to resume the lesson, knob 96 is placed in the record position, and knob 98 is placed in the forward position. At this time motor 8 resumes operation and the lesson tape signal is recorded on tape 82.

Switch 62, manually operable by the student, controls the recording of sound on sound. When the switch is operated, contact 66 opens and contact 67 closes. With the opening of contact 66, relay 60 cannot operate even if button switch 45 is closed because winding 61 is not returned to the AC source. It will be recalled that during normal operation both the lesson tape and student response signals are transmitted by a single contact 68 and conductor 74 to one input of amplifier 80. Of course, only one of the two signals is recorded depending on the position of contact 68 and the state of relay 60. With the relay inhibited from operating, contact 68 remains in the position shown and the lesson tape signal on conductor 53 is extended to the first input conductor 74 of amplifier 80. During the sound-on-sound recording the student response signal is extended via conductor 49 and contact 67 to conductor 73, connected to the second input of amplifier 80. The two signals are mixed in the amplifier and recorded simultaneously on tape 82. During this sound-on-sound recording both motors continue to run. When switch 62 is released normal operation ensues, with either the lesson tape signal or the student response signal being recorded on tape 82 in accordance with the position of switch 45.

During the sound-on-sound recording the lesson tape signal is extended via conductors 92 and 93 to speaker 86, and since transducer 48 is also enabled there may be audible feedback through the system. Accordingly, in certain situations it is advisable to allow the student to listen to the lesson tape only through a headset. This is also desirable if a number of students are studying in the same room and interferance must be avoided. Ordinarily, the output signal from amplifier 80 is extended through conductor 92, contacts 91 and 89, conductor 88, speaker 86 and conductors 87 and 93 back to amplifier 80. When a headset is inserted into jack 90, however, contacts 89 and 91 are disengaged and the speaker is disabled. At this time current flows through conductor 92, contact 91, the headset, and conductor 93 back to the amplifier.

As described above, in certain situations it is desirable to automatically control the stopping of the lesson tape after particular segments have been played, and to allow the running of the tape to resume only after the student has made a response. In such cases a high frequency inaudible tone may be recorded on the lesson tape at the end of each such segment. To enable the teaching machine to operate in this mode switch 65 is closed by the student. The tone on conductor 53 is extended to input conductor 74 of amplifier 80, but since the tone is inaudible the recording of this tone on tape 82 does not affect the system operation. The tone, as well as the entire lesson tape signal, is extended via conductor 53 and switch 65 to detector 38. This detector is of conventional design and simply detects the presence of the high frequency tone. When the tone is detected the detector applies a potential across conductors 36 and 37. The current flowing through these conductors and winding 35 of relay 34 causes the relay to energize and contact 31 to open. With the opening of contact 31, in series with the winding of motor 8, the motor turns off and the lesson tape comes to a stop.

The end-of-question detector 38 maintains the potential across conductors 36 and 37 until after the student has recorded a response on tape 82. The detector is reset with the application of a negative pulse to reset terminal 59. Conductor 52 is connected to a positive DC potential in amplifier 80. When the student first operates button 45 to control the recording of his response, relay 60 energizes and contact 70 closes. The positive potential from conductor 52 is extended through contact 70 and conductor 71 to capacitor 41. Although a positive pulse is thus coupled to reset terminal 59 it has no effect on detector 38, since the detector only resets upon the application of a negative pulse to terminal 59. When the student has completed his response, however, and has released button 45, relay 60 de-energizes and contact 70 opens. At this time capacitor 41 discharges through resistors 40 and 42. Current flows in a clockwise direction through the two resistors and the capacitor, and as a result of this current flow a negative pulse is applied to terminal 59. The negative pulse resets detector 38 and relay 34 de-energizes. With the closing of contact 31 motor 8 resumes running. It should be noted that it is the release of switch 45 which allows the lesson tape to resume play. However, button 45 may not be released until after it is first operated. Accordingly, the lesson is not resumed until after the student has placed the system in a condition to record a student response.

End-of-lesson detector 20 is similar to detector 38 but serves a different function. The function of detector 20 is to control the automatic disabling of motor 8 after the complete lesson has been played. This prevents a partial run-on into the beginning of the lesson and a possible confusion on the part of the next student using the lesson tape cartridge. When cartridge 5 is placed in the machine, contact 17 closes to short-circuit conductors 18 and 19. The shorting of these conductors has no effect on detector 20. At the end of the lesson recorded on tape 6, the metallic section on the tape passes over contacts 15 and 16. At this time conductors 13 and 14 are shorted through the contacts and detector 20 applies a potential across conductors 25 and 26. The resulting current flowing through winding 27 energizes relay 28 and contact 29 opens. Since this contact is in series with motor 8 the motor ceases to operate and tape 6 stops turning. Detector 20 maintains the potential across conductors 25 and 26 until contact 17 opens. It is the opening of the connection between conductors 18 and 19 that de-energizes detector 20. Contact 17 is biased to spring open but can do so only if cartridge 5 is removed from the machine. When the cartridge is removed contact 17 opens, relay 28 de-energizes and contact 29 closes. Motor 8 can thus resume operation. Upon the placing of a new cartridge in the machine, the normal operations ensues. The purpose of requiring cartridge 5 to be removed from the machine in order for motor 8 to resume functioning is that the lesson tape cannot be played inadvertently past the end of the lesson if the student is required to remove it from the machine in order to control the further operation of motor 8.

FIG. 2 illustrates a typical recording sequence when the lesson tape contains music instruction. The upper and lower waveforms each have two levels, stop and run. The stop level indicates that the respective tape is at a standstill. The upper level indicates that the respective tape is running. The middle waveform has two levels, on and off, representing the operation of transducer 48 in accordance with the position of switch 45.

At the very beginning of the lesson both tapes run. A short segment of the lesson tape at the beginning is blank to give the student a chance to get ready. The student then hears introductory instructions followed by a first question. At the same time the material is recorded on the tape. At the end of the question the student operates button 45 to stop the lesson tape and to turn on the microphone. A short time is required to operate button 45 after the end of the question and accordingly, as shown in FIG. 2, the lesson tape runs on slightly before motor 8 shuts off. Short blank gaps may be provided on the tape between successive questions if necessary. If switch 65 is operated and end-of-question detector 38 is enabled, the lesson tape stops automatically.

The student then voices his answer into the microphone, the answer being recorded on the student tape. At the of the response button 45 is released and the lesson tape resumes running, with the next question being recorded on the student tape. Following this question, the lesson tape stops when button 45 is operated or detector 38 detects the high frequency tone. The student then gives his answer.

Following the two questions recorded on the lesson tape, there is an introductory portion for the next sequence. Typically, this portion may be a description by the teacher of a piano selection to be played, followed by the playing of the piece. The introductory material is recorded on the student tape. Toward the end of the introduction the teacher informs the student that he should play along on his own piano with the teacher who will repeat the piece. The teacher also informs the student to operate sound-on-sound switch 62. When the student operates the switch the microphone is enabled, and when the teacher starts playing the piece the student plays along. Both the student and teacher playings are recorded on the student tape as shown by the double-hatched region in the lower waveform. Following the teacher playing on the lesson tape there is an instruction to the student to release the sound-on-sound switch 62, followed by additional program material. When the student releases the switch the microphone is disabled and the lesson material is recorded on the student tape while the student hears it.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A teaching machine comprising means for driving a lesson tape; means for driving a student tape; means for sensing signals recorded on said lesson tape; means for deriving signals corresponding to audible messages of a student using the machine; two-position manually controlled means, said manually controlled means, when in a first position, controlling both the operation of said lesson tape driving means and the recording of the sensed lesson tape signals on said student tape, and, when in a second position, controlling the recording of said student message signals on said student tape and the inhibiting of the operation of said lesson tape driving means; said student tape having a length sufficient to permit the complete recording thereon of the lesson recorded on said lesson tape and student messages given in response thereto; and speaker means for reproducing signals recorded on said lesson and student tapes.

2. A teaching machine in accordance with claim 1 further including means for selectively preventing the inhibiting of the operation of said lesson tape driving means by said manually controlled means and for govering the simultaneous recording on said student tape of said sensed lesson signals and said student message signals.

3. A teaching machine in accordance with claim 1 further including means for stopping said lesson tape driving means at the end of predetermined lesson sequences recorded thereon and for inhibiting subsequent operation of said lesson tape driving means until after the student has moved said manually controlled means to said second position and back to said first position during normal operation.

4. A teaching machine in accordance with claim 1 further including means for preventing the operation of said lesson tape driving means at the end of the lesson recorded on said lesson tape until after said lesson tape is removed from the machine and the same or another lesson tape is reinserted in the machine.

5. A teaching machine in accordance with claim 2 further including means for stopping said lesson tape driving means at the end of predetermined lesson sequences recorded thereon and for inhibiting subsequent operation of said lesson tape driving means until after the student has moved said manually controlled means to said second position and back to said first position during normal operation.

6. A teaching machine in accordance with claim 2 further including means for preventing the operation of said lesson tape driving means at the end of the lesson recorded on said lesson tape until after said lesson tape is removed from the machine and the same or another lesson tape in reinserted in the machine.

7. A teaching machine in accordance with claim 3 wherein said stopping means includes mean for detecting an inaudible frequency in said sensed lesson signals, means for disabling said lesson tape driving means responsive to the detection of said frequency by said detecting means, and means responsive to the operation of said manually controlled means by said student for resetting said disabling means.

8. A teaching machine in accordance with claim 4 wherein said preventing means includes means for detecting a conducting strip on said lesson tape at the end of said lesson, means for disabling the operation of said lesson tape driving means responsive to the operation of said detecting means, and means for resetting said detecting means responsive to the removal of said lesson tape from the machine and the reinsertion of the same or another lesson tape in the machine.

9. A teaching machine in accordance with claim 2 further including an amplifier having two inputs for extending said sensed lesson signals and said student message signals to said student tape, said manually controlled means being operative to couple either said sensed lesson signals or said student message signals to a first of said amplifier inputs, said preventing and governing means including means for coupling said sensed lesson signals to one of said amplifier inputs and said student message signals to the other of said amplifier inputs independent of the operation of said manually controlled means.

10. A teaching machine in accordance with claim 1 wherein said manually controlled means includes an amplifier for selectively recording said sensed lesson signals and said student message signals on said student tape, said amplifier inuluding a first switch for controlling record and playback functions of said student tape and a second switch for controlling forward and rewind motions of said student tape, and means for enabling the operation of said lesson tape driving means only when said first switch controls said record function and said second switch controls said forward motion.

References Cited

UNITED STATES PATENTS

| | | |
|---|---|---|
| 2,787,669 | 4/1957 | Flan et al. |
| 3,156,052 | 11/1964 | Irazoqui. |
| 3,234,666 | 2/1966 | Cooper. |
| 3,377,437 | 4/1968 | Probst. |

EUGENE R. CAPOZIO, Primary Examiner

WILLIAM H. GRIEB, Assistant Examiner

U.S. Cl. X.R.

179—100.2